United States Patent [19]

Sanmartin et al.

[11] Patent Number: 4,952,440

[45] Date of Patent: Aug. 28, 1990

[54] INSULATION ASSEMBLY DESIGNED FOR THERMAL PROTECTION OF A STRUCTURE SUBJECTED TO CONDITIONS OF INTENSE THERMAL AGGRESSION

[76] Inventors: Marie-Louise Sanmartin, Semeac; Jean-Francois Fries, Tarbes, both of France

[21] Appl. No.: 174,162

[22] Filed: Mar. 28, 1988

[30] Foreign Application Priority Data

Mar. 13, 1987 [FR] France .................... 87 03477

[51] Int. Cl.⁵ .................................. B32B 3/12
[52] U.S. Cl. ............................... 428/116; 52/806
[58] Field of Search ................ 428/116, 117, 118; 52/806; 156/292

[56] References Cited

U.S. PATENT DOCUMENTS

| | | | |
|---|---|---|---|
| 3,366,525 | 1/1968 | Jackson | 428/116 X |
| 3,616,139 | 10/1987 | Jones | 52/806 X |
| 3,690,606 | 9/1972 | Pall | 428/116 X |
| 4,014,147 | 3/1977 | Wesch | 428/116 X |
| 4,016,022 | 4/1977 | Browning et al. | 428/116 X |
| 4,084,366 | 4/1978 | Saylor et al. | 52/806 X |
| 4,125,053 | 11/1978 | Lasker | 428/116 X |
| 4,235,303 | 11/1980 | Dhoore et al. | 428/116 X |
| 4,338,273 | 7/1982 | Schnedecker | 428/116 X |
| 4,482,111 | 11/1984 | Le Touche | 428/921 X |
| 4,495,764 | 1/1985 | Gnagy | 428/116 X |
| 4,513,041 | 4/1985 | Delluc | 428/69 |
| 4,588,626 | 5/1986 | Cologna et al. | 428/116 X |
| 4,592,950 | 6/1986 | Le Touche | 428/920 X |
| 4,743,740 | 5/1988 | Adee | 428/116 X |
| 4,814,371 | 3/1989 | Le Touche | 524/405 |

FOREIGN PATENT DOCUMENTS

2272236 12/1975 France ...................... 428/178
1267158 3/1972 United Kingdom ........ 428/131

Primary Examiner—Henry F. Epstein
Attorney, Agent, or Firm—Arnold, White, & Durkee

[57] ABSTRACT

The invention relates to an insulation assembly designed for thermal protection of a structure, including three stacked layer of different types. The outer surface layer consists of a composite material with a mineral matrix, in particular made of clays capable of reacting in an aqueous medium, coating structural reinforcement fillers consisting of fibers, in particular as fabric, fiber layup, prepreg, mat, etc. The intermediate layer consists of a refractory mineral material such as a lightweight felt. The inner surface layer consists of a thermally insulating honeycomb material, in particular with a thermoplastic or thermosetting resin base. In addition, reflectors consisting of aluminized screen, can be provided at the interface of each layer.

14 Claims, 1 Drawing Sheet

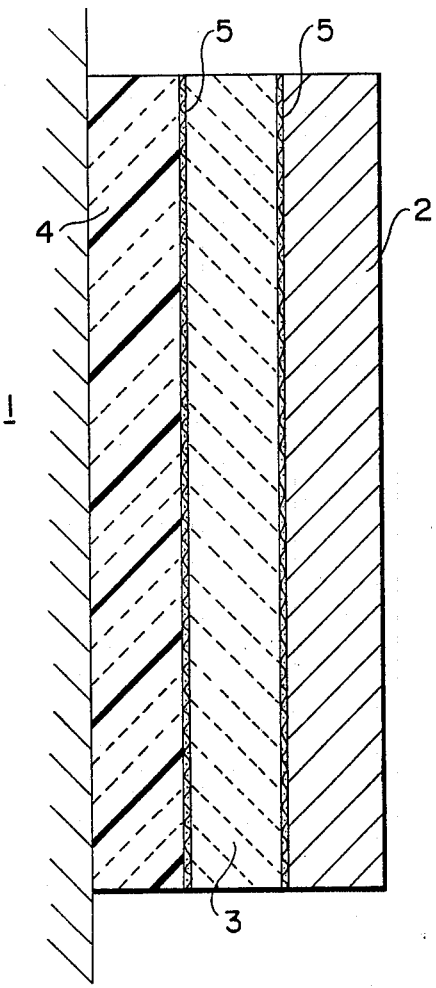

INSULATION ASSEMBLY DESIGNED FOR THERMAL PROTECTION OF A STRUCTURE SUBJECTED TO CONDITIONS OF INTENSE THERMAL AGGRESSION

BACKGROUND OF THE INVENTION

The invention relates to an insulation assembly designed for thermal protection of a structure submitted to conditions of intense thermal aggression.

Many protection systems are available to maintain a structure at a permissible temperature when the structure is submitted to conditions of intense thermal aggression for a variable length of time. These protections can be classified in three different categories according to their mode of action: active protection, semiactive protection, passive protection.

Active protections consist of insulation integrating active material designed to vaporize or transpire during heating of the shield. These protections, such as those described in French patent Nos. 2 061 509, 2 512 169, 2 547 895 and 2 592 131, globally stabilize the temperature of the structure to be protected at the vicinity of the vaporization or transpiration temperature of the active material (approximately 100° C. in the case of water). They then act as ordinary insulators. It can be seen that the temperature rise of the structure is non-negligible. In addition, the protection is effective only as long as the active material is not totally depleted. Therefore, in the case of fire, there is a risk of a lack of active material whose role and function are essential with regard to the efficiency of the protection. The solution to this problem, consisting of recirculating, in the case of water, the superheated steam after condensing it, or reinjecting the water (or selected liquid) as it evaporates, is moreover not suitable in all cases.

As for semiactive protections, they consist of ablative materials of medium specific gravity (approximately 1.7) such as, for instance, a carbon-carbon composite consisting of fibers or a carbon fabric embedded in a carbon matrix. Although offering good protection, these materials have two major drawbacks. First of all, they are radiating external insulators or ablative materials above a certain temperature. Accordingly, as above, the protection decreases as the shield is consumed (for instance by burning). Furthermore, such shields are relatively costly.

Finally, passive protections include the many external insulation systems obtained by various associations of protective coatings based on refractory fibers, quartz or silica wools, various honeycomb materials or reflecting screen systems. Currently, however, no passive protection capable of preventing the internal temperature rise of a structure maintained in a fire for at least one hour exists with an acceptable specific weight and cost.

SUMMARY OF THE INVENTION

The purpose of this invention is to overcome the drawbacks in conventional protections and proposes to provide low density, low cost passive protection capable of maintaining a constant temperature of approximately 20° C. within a structure submitted to intense thermal aggressions for at least one hour.

Another object of the invention is to provide protection which does not burn and does not release toxic or corrosive gases.

Another object is to provide protection which, after a thermal test, exhibits very little damage, and can thus be readily refurbished.

Another object is to provide protection which can be applied to the structure to be protected either directly as panels to be bonded or in consecutive layers.

For this purpose, the insulation assembly designed for thermal protection of a structure, the subject of the invention, is characterized in that it consists of at least three stacked layers of different types:

a first surface layer, called the outer layer, consisting of a composite material including a mineral matrix coating structural reinforcement fillers, an intermediate layer consisting of a mineral refractory material, a second surface layer, called the inner layer, consisting of an alveolar material providing thermal insulation.

It should be noted that the term alveolar material includes syntactic foams.

This insulation assembly therefore consists of three separate layers, each with a specific role, whose association provides a total thermal insulation assembly of low density, not capable of burning or releasing toxic or corrosive gases.

The outer surface layer provides the structural cohesion of the insulation assembly and consists of a composite material resistant to fire and thermal shock.

This material advantageously includes a mineral matrix made of a hardenable material, capable of hardening in an aqueous medium under the action of alkaline reagents. It can be produced by all conventional processes for manufacturing laminated materials such as contact, layup, winding, etc. used for thermosetting organic composite materials, with the benefit of preserving thermal stability up to at least 1300° C.

The thickness of this layer can vary between a few tens of millimeters and several centimeters depending on the requirements of minimum specific weight or, on the contrary, the degrees of desired structural strength or thermal inertia.

The intermediate layer consisting of a low density refractory mineral material provides the fire barrier. This layer advantageously consists of lightweight felt made of refractory fibers, mainly silica and alumina, and possibly other materials chosen to decrease conduction.

This felt, with a density of 150 to 400 $kg/m^3$, is additionally chosen to withstand specified temperatures: 1200° C., 1400° C. or 1600° C. The thickness of the felt varies from a few millimeters to several tens of millimeters depending on the expected levels of thermal aggression and the protection to be provided.

The inner layer consists of a thermally insulating honeycomb material and is the heat shield of the insulation assembly. This layer is advantageously made of a low density material with a thermosetting or thermoplastic resin base.

Supplementing these three layers, the insulation assembly can additionally be provided with reflectors consisting of aluminized screens located at the interfaces between layers and preferably coated with a protective film against alkaline reagents. These reflectors are in effect used to reflect heat radiation.

In a preferential embodiment, this insulation assembly includes:

an outer surface layer consisting of a composite material with a clay base mineral matrix, with the clay being modified to make them reactive and capable of reacting in an aqueous medium under the action of alkaline hardeners, and structural reinforcement fillers consisting of metal fibers, in particular stainless steel, or mineral fibers as fabric, fiber layup, preferably having received a protective coating against alkaline reagents, or in prepreg form;

an intermediate layer consisting of a lightweight felt made of refractory fibers;

an inner surface layer consisting of a low density material of natural origin such as cork or with a thermosetting or thermoplastic resin base; and reflectors consisting of aluminized screens located at the interfaces between layers.

An insulation assembly such as that described above has a very low specific weight of between 8 and 14 kg/m$^2$. In addition, by varying the thickness of the various layers, the loading rates, etc., the protection can be exactly dimensioned according to the security to be provided, for instance a temperature of 20° C. within a structure for a given time and for given external temperatures.

Furthermore, the insulation assembly is very easy to implement and can be made either from prefabricated panels to be bonded to a structure or by applying the materials in consecutive layers directly on the structure. These characteristics allow use of this insulation assembly to be considered for a variety of applications, for example:

protection against the thermal effects of nuclear weapons or other intense thermal aggressions of fixed or mobile installations housing men, equipment, explosive stores or weapons stores etc; and use for civil needs, e.g., building, transportation, firewall or packaging of heat-sensitive products or devices.

Actually, in a general manner, the invention can be applied advantageously to protect any structure made of composite materials or conventional lightweight alloys incapable of withstanding high temperatures without a substantial decrease in the mechanical properties of the component materials.

BRIEF DESCRIPTION OF THE DRAWING

FIG. 1 is a diagram illustrating an insulation assembly according to the invention, mounted on the wall of a structure to be protected. Other characteristics, objectives and advantages of the invention will be seen from the following description making reference to the drawing.

DETAILED DESCRIPTION OF THE INVENTION

The protective coating illustrated in FIG. 1, bonded to the surface of a structure 1 to be protected includes, first of all, an outer surface layer 2 capable of withstanding thermal, chemical and atmospheric aggressions and providing a certain mechanical strength. This outer layer 2 consists of a composite material of low thickness, between a few tens of millimeters and several centimeters, whose mineral matrix consists of a hardenable material capable of hardening in an aqueous medium under the action of alkaline reagents and which coats structural reinforcement fillers.

This mineral matrix is made of clays modified to make them active and capable of reacting in an aqueous medium under the action of liquid alkaline hardeners to give, after hardening, a refractory material with a specific gravity between 1.1 and 1.4. The adjustment of the specific gravity is obtained by including additional powdered refractory fillers in the composite material in given proportions. These fillers can be made of ground quartz ceramic powder, sand, zircon, etc In addition, this matrix can be of the 100% mineral type (ceramics, aluminosilicates, etc.) or of the organic material type, i.e. including a small amount of organic binders which may or may not carbonize.

As for the structural reinforcement fillers of the matrix, they consist of fibers, in particular as fabric, fiber layup, prepreg, mat, etc. These fibers can be of metallic origin (stainless steel), mineral origin (glass, silica, etc.), organic origin (carbon, "aramide", polyester, etc.) or refractory origin and may have received a protective coating against alkaline reagents. The mineral matrix additionally has the advantage of being an adhesive well suited to assembly of the composite material on an infrared radiation reflecting screen formed by a thin sheet of polished aluminum or aluminum foil.

Layer 3 underlying outer layer 2 consists of a lightweight felt of refractory fibers such as silica or alumina forming the fire barrier. This felt, with a density variable between 150 and 400 kg/m$^3$, is designed to withstand specified temperature levels: 1200° C., 1400° C. or 1600° C. Its thickness varies from a few millimeters to several tens of millimeters according to the expected levels of thermal aggression and the level of protection to be provided.

Such a felt, for instance, of the 1200° C. category, when subjected for approximately 60 minutes to a flame whose average temperature is 1000° C., allows the temperature to be held below 150° C. on the side opposite the flame for a felt thickness of 30 mm.

Layer 4 underlying intermediate layer 3 consists of a thermally insulating alveolar or syntactic material of low density, possibly filled with refractory powder. It can also be made of cork, used in panels.

This alveolar material has a thermoplastic or thermosetting resin base such as a rigid closed-cell polyurethane foam. This foam, of variable thickness (approximately 10 to 100 mm) has a density adjustable from 30 to 100 kg/m$^3$. The refractory powder contained in the foam is incorporated during production either with one of the constituents (isocyanate or polyol) or with the foaming agent used if any.

The choice of this polyurethane foam, although not restrictive, is dictated by the many advantages of this low cost material which has many possibilities of industrial use, with great ease, by casting, in panels, in layup, in open or closed cells, by spraying, etc.

In addition, this material has the property of adhering to all construction materials, accompanied by immediate foaming.

Finally, this insulation assembly includes, at the interface between each of layers 2, 3 and 4, reflecting screens 5 made of aluminum foil or polished aluminum sheets. The purpose of these screens 5 is to reflect heat radiation.

Such an insulation assembly can be used either by direct application of panels bonded on the structure to be protected or by consecutive application of the layers.

In addition, the insulation assembly can be painted or solid dyed.

Once installed, and according to the various thicknesses and constituents of each layer, this insulation assembly guarantees holding of a constant temperature, in the neighborhood of 20° C., inside a structure subjected to conditions of intense thermal aggression, with or without flames.

During such a thermal aggression, the insulation assembly also has the advantage of not burning and not releasing toxic or corrosive gases. The only damage affecting the insulation assembly is restricted to crumbling of the outer layer 2. It can thus be seen that after partially or totally renewing the outer layer, the insulation assembly can be used again with no degrading of its capabilities.

The following examples clearly illustrate the characteristic behavior of an insulation assembly in accordance with the invention submitted to two types of thermal aggression.

EXAMPLE 1

During this test, the insulation assembly was applied to a light alloy enclosure with a wall thickness of 2 mm inside which it was desired to maintain a temperature of 20° C. The outer dimensions of the resulting structure were 500×350×50 mm with insulation assembly layer thicknesses of 40 mm, 25 mm and 1.5 mm from inside to outside.

This enclosure was placed in a fire obtained by burning wood of different species, with a predominance of resinous species.

Suitably located thermal probes inside the metal enclosure and installed in the interfaces of the insulation assembly when producing it allowed the magnitude and distribution of the thermal effect, mainly diffused by conduction, to be observed during the test.

After one hour of exposure to this environment of flames and embers, it was observed that:

(1) the internal temperature in the enclosure did not vary;

(2) the curve of temperature variation for the probe located between the mineral felt and the foam indicates that the temperature did not vary during the first 15 minutes; it reached 100° C. after the next 15 minutes and remained at this value up to the 50th minute; it then increased up to 140° C. when the planned exposure time of one hour was extended by approximately 10 minutes;

(3) the curve of temperature variation for the probe located on the outer wall of the chamber is roughly equal to the general temperature of the fire and flames; this probe indicated a value of 700° C. for the first 50 minutes; the temperature then settled at a level varying between 900° C. and 1000° C.

After the test, the fire was extinguished and the enclosure was removed. Its visual apperance was not modified by the aggression, except for a slight intumescence of the surface composite, which became slightly crumbly.

The other layers remained intact.

This enclosure can be repaired for a new test: by shallow cuts followed by peeling, the damaged composite is removed from the enclosure and the composite is then renewed by usual lamination methods.

EXAMPLE 2

An insulation panel equipped with four thermal probes located at the interfaces between layers was subjected to the action of the flame of an oxyacetylene torch (nozzle of approximately 400 liters) for 30 minutes at a distance of 100 mm from the flame tip.

Observation of the curve of temperature variation at the end of the test showed that:

the temperature of the probe located between the surface layer composite and the mineral felt rose to approximately 1000° C.;

the probe located in the median region of the mineral felt indicated a temperature of 300° C.;

the probe located at the interface between the mineral felt and the insulating foam showed that the temperature reached 150° C. in this region;

the probe located in the median region of the foam showed that the temperature remained below 50° C.

After repair of the outer composite layer, this panel was again subjected to an aggression, similar in all points, with no visible damage or appreciable loss of cohesion and characteristics.

While the present invention has been described with reference to specific examples, it is understood that various modifications of the invention are possible without departing from the spirit or scope of the present invention as recited in the appended claims.

We claim:

1. An insulation assembly designed for thermal protection of an underlying structure on which said assembly is bonded, said assembly being subjected to a thermal aggression of a temperature of about 1000° C., said assembly comprising:

an inner layer bonded or adjacent said structure, said inner layer consisting of a thermally insulating alveolar or syntactic material having a density of about 30 to 100 kg/m$^3$ and a thickness of about 10 to 100 mm;

an intermediate layer bonded on said inner layer, said intermediate layer consisting of a refractory mineral material made of a lightweight felt of refractory fibers, said material having a density of about 150 to 400 kg/m$^3$; and an outer surface layer bonded on said intermediate layer, said outer surface layer consisting of a composite material including a mineral or organomineral matrix coating structural reinforcement fillers made of metal, mineral or organic fibers, said outer surface layer having a specific gravity of about 1.1 to 1.4.

2. An insulation assembly according to claim 1, wherein said inner layer is made of a material selected from the group consisting of cork, thermosetting resin or thermoplastic resin.

3. An insulation assembly according to claim 2, wherein said inner layer consists of a rigid closed-cell polyurethane foam including refractory powder filler.

4. An insulation assembly according to claim 1, wherein said intermediate layer is a lightweight felt of refractory fibers of silica and alumina.

5. An insulation assembly according to claim 1, wherein said matrix of said outer layer comprises a mineral hardenable material base which is hardenable in an aqueous medium under the action of alkaline reagents.

6. An insulation assembly according to claim 5, wherein the mineral matrix comprises clays, which are reactive in an aqueous medium under the action of liquid alkaline hardeners.

7. An insulation assembly according to claim 1, wherein the structural reinforcement fillers of said outer layer consist of metal fibers or mineral fibers in the form of a fabric, fiber layup, having a protective coating against alkaline reagents, or in prepreg form.

8. An insulation assembly according to claim 7, wherein the metal fibers consist of stainless steel.

9. An insulation assembly according to claim 7, wherein the mineral fibers consist of glass or silica.

10. An insulation assembly according to claim 1, wherein said structural reinforcement fillers consist of organic fibers of carbon, aramid, and polyester, in at least one form selected from the group consisting of fabric, fiber layup, prepreg, and mat.

11. An insulation assembly according to claim 1, wherein said inner layer includes a refractory powder filler.

12. An insulation assembly according to claim 1, wherein a reflective layer is interposed between said inner layer and said intermediate layer, and between said intermediate layer and said outer surface layer.

13. An insulation assembly according to claim 12, wherein a reflective layer consists of an aluminized screen.

14. An insulation assembly designed for thermal protection of an underlying structure on which said assembly is bonded, said assembly being subjected to a thermal aggression of a temperature of 1000° C., said assembly comprising:

an inner layer bonded or adjacent said structure, said inner layer consisting of a thermally insulating alveolar or syntactic material having a density of about 30 to 100 kg/m$^3$ and a thickness of about 40 mm;

an intermediate layer bonded on said inner layer, said intermediate layer consisting of a refractory mineral material made of a lightweight felt of refractory fibers, said material having a density of about 150 of 400 kg/m$^3$ and a thickness of about 25 mm;

an outer surface layer bonded on said intermediate layer, said outer surface layer consisting of a composite material including a mineral or organomineral matrix coating structural reinforcement fillers made of metal, mineral or organic fibers, said outer layer having a specific gravity of about 1.1 to 1.4, and a thickness of about 1.5 mm; and aluminized reflective screens interposed between said layers.

* * * * *